United States Patent [19]

Rose et al.

[11] 4,285,015
[45] Aug. 18, 1981

[54] METHOD AND APPARATUS FOR LOCATING A MOVABLE SERVO CONTROLLED MEMBER DURING POSITION SIGNAL DROP-OUT

[75] Inventors: Andrew M. Rose, Mountain View; Frank J. Sordello, Los Gatos, both of Calif.; James J. Touchton, Boulder, Colo.

[73] Assignee: Sperry Corporation, New York, N.Y.

[21] Appl. No.: 102,304

[22] Filed: Dec. 10, 1979
(Under 37 CFR 1.47)

[51] Int. Cl.³ .............................................. G11B 21/08
[52] U.S. Cl. ....................................... 360/78; 360/77; 360/106; 360/27
[58] Field of Search ................................. 360/77–78, 360/51, 27, 106; 318/594, 596

[56] References Cited

U.S. PATENT DOCUMENTS

| 3,427,606 | 2/1969 | Black et al. | 360/78 X |
| 3,458,785 | 7/1969 | Sordello | 360/77 |
| 3,691,543 | 9/1972 | Mueller | 360/51 X |
| 3,737,883 | 6/1973 | Sordello et al. | 360/78 |
| 3,755,795 | 8/1973 | Sordello et al. | 360/78 |
| 3,864,740 | 2/1975 | Sordello et al. | 360/77 |
| 3,883,894 | 5/1975 | Johnson | 360/78 |
| 4,006,394 | 2/1977 | Cuda et al. | 318/594 |
| 4,085,427 | 4/1978 | Dunn | 360/77 |

Primary Examiner—John H. Wolff
Attorney, Agent, or Firm—Thomas Schneck, Jr.; Eugene T. Battjer; William E. Cleaver

[57] ABSTRACT

As an aid in counting servo tracks in a position servo system, a position window detector (30) which normally provides coarse and fine pulses to counting logic (53) also provides fine pulses to a reset switch (45) of a tachometer signal integrator means (33), resetting the integrator once for each track. In the event of position signal drop-out wherein coarse pulses are not properly generated, a threshold detection means (43) senses when the output of the integrator reaches a threshold level and produces a threshold reached signal which is transmitted to counting logic means (53) for incrementing a track counter (61).

16 Claims, 4 Drawing Figures

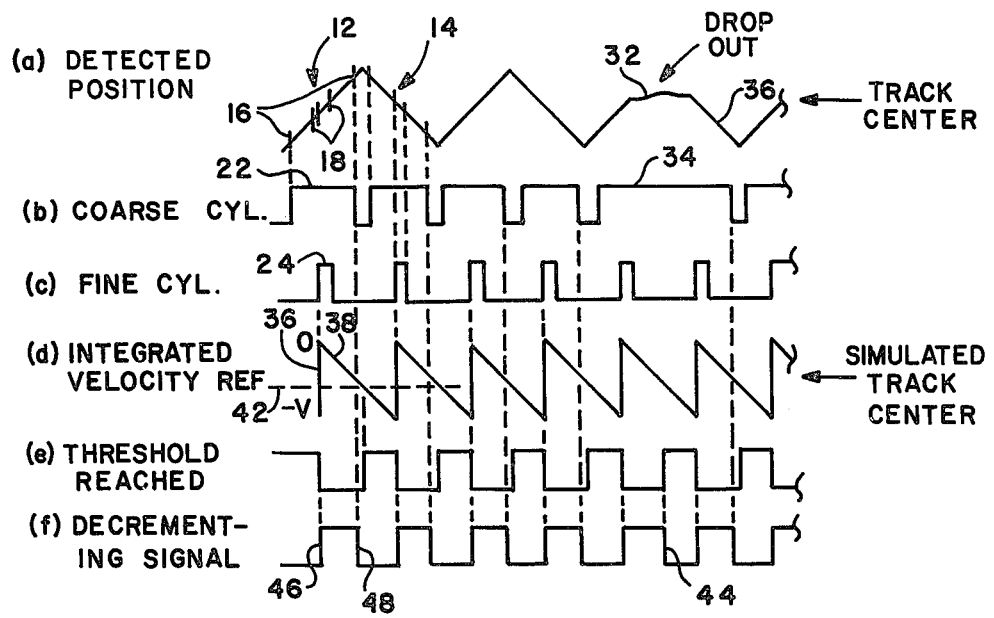
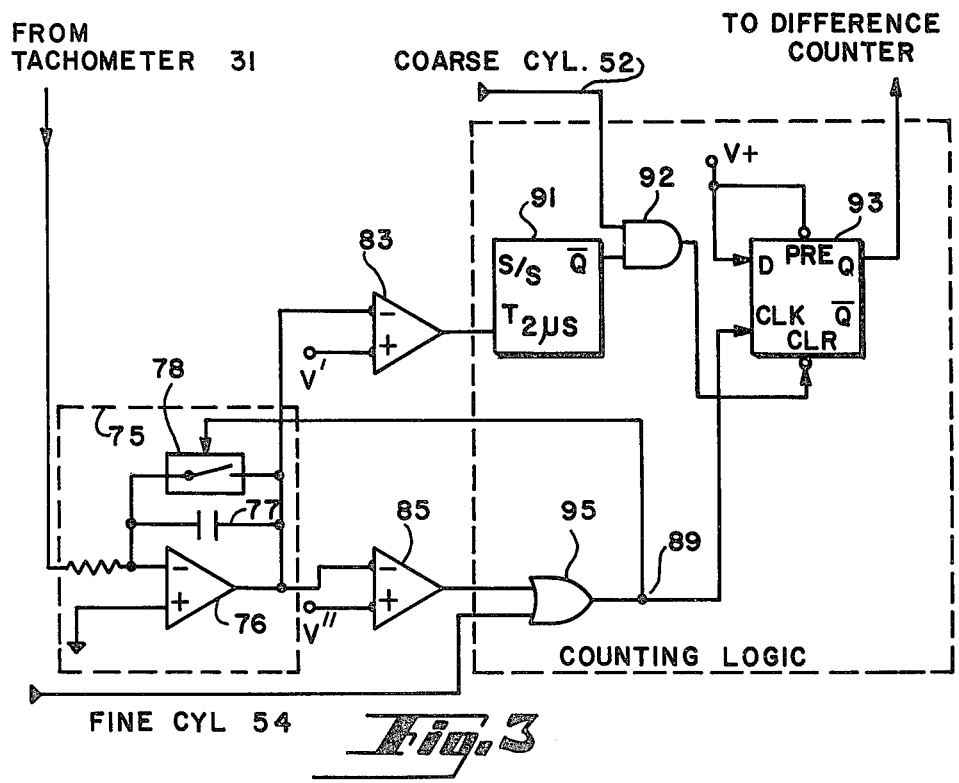

METHOD AND APPARATUS FOR LOCATING A MOVABLE SERVO CONTROLLED MEMBER DURING POSITION SIGNAL DROP-OUT

BACKGROUND OF THE INVENTION a. Field of the Invention

The invention relates generally to position servo systems of the kind used to position movable members, paricularly read/write transducers, relative to servo tracks on an information storage medium, such as a disk. In particular, the invention relates to a method and apparatus for determining the crossing of servo tracks while a transducer is traversing the tracks, when the position signal derived from the tracks drops out.

b. Prior Art

In accessing a desired servo track of an information storage medium or the like, a movable member such as a read/write transducer is usually moved across many tracks, each of which is counted, until the desired track is reached. Servo systems for accessing the desired track, as well as for maintaining the read/write transducer in the center of a desired track are termed position servo systems. It is known in the prior art that sawtooth waveforms may be obtained from a transducer crossing servo tracks and used for sensing transducer position in accessing a desired track. Such waveforms represent the position of the transducer or movable member relative to the next adjacent track. For example, see U.S. Pat. No. 3,737,883, entitled "Linear Positioning Apparatus for Memory Disk Pack Drive Mechanisms" by F. J. Sordello and I. W. Ha.

An example of an invention relating to accessing a target track on a disk, using a sawtooth position waveform may be found in U.S. Pat. No. 4,006,394, entitled "Coarse and Fine Control for Position Servo" by J. Cuda and F. J. Sordello, while an example of an invention relating to centering the transducer on a target track of a disk may be found in U.S. Pat. No. 3,864,740, entitled "Track Following Servo System", by the same inventors. The former patent teaches that a transducer velocity circuit, measuring the speed at which the transducer moves radially across the tracks, i.e., a tachometer, produces a velocity signal which may be integrated to yield a reconstructed position signal which signals the approach of a desired track. The latter patent teaches a typical prior art construction of a position servo loop.

Previously, as described in the aforementioned U.S. Pat. No. 4,006,394, a track crossing detector senses the crossing of a servo track by a movable member, such as a read/write transducer and provides an incremental count signal to a differential counter. This system is effective as long as the position signal can be detected.

Sometimes due to defects in the media on which the tracks are recorded, or other reasons related to noise, the position signal may not reach the extremities of the sawtooth waveform. In other instances the position signal, for various reasons, may simply momentarily disappear. These problems are termed signal "drop-out" herein. In these instances, the crossing detector which relies on this waveform will sense an incorrect track count and wrongly determine the position of the transducer.

SUMMARY OF THE INVENTION

An object of the invention is to compensate for position signal drop-out in order to obtain a correct track count as a movable member crosses a plurality of servo tracks.

The object has been achieved by simulating the position signal electrically and then using the simulated signal as a counting aid during drop-out or as a substitute for the detected position signal during drop-out. Ordinarily, a servo track counting latch is set somewhere during a track crossing, such as at a zero crossing of the actual position signal and then reset by sensing another position, such as an extremity of a track. But, since such extremities are represented by signals subject to drop-out, they are replaced during drop-out by a simulated position signal derived by integrating the velocity signal of a tachometer for a movable member. The integrator is reset once for each servo track at a level of the actual position signal which is still detected. A threshold detector is used to detect a preset level of the simulated position signal generated by the integrator corresponding to the dropped-out portion of the actual position signal thereby providing a correct track count.

During position signal drop-out extending over several position signal periods the same approach may be used, except that the integrator cannot be reset at a level of the actual position signal since it is absent. In this instance a second threshold detector with a reference voltage corresponding to the width of the servo track is used to reset the integrator in the absence of track crossing pulses. When track crossing pulses are present the integrator is reset by the track crossing signal.

BRIEF DESCRIPTION OF THE DRAWINGS

FIG. 2 shows electrical waveforms occurring in the circuit of FIG. 1.

FIG. 3 shows a modified electrical plan of the apparatus of FIG. 1 for use during position signal drop-out extending over several position signal periods.

DESCRIPTION OF THE PREFERRED EMBODIMENT

Figure 1:
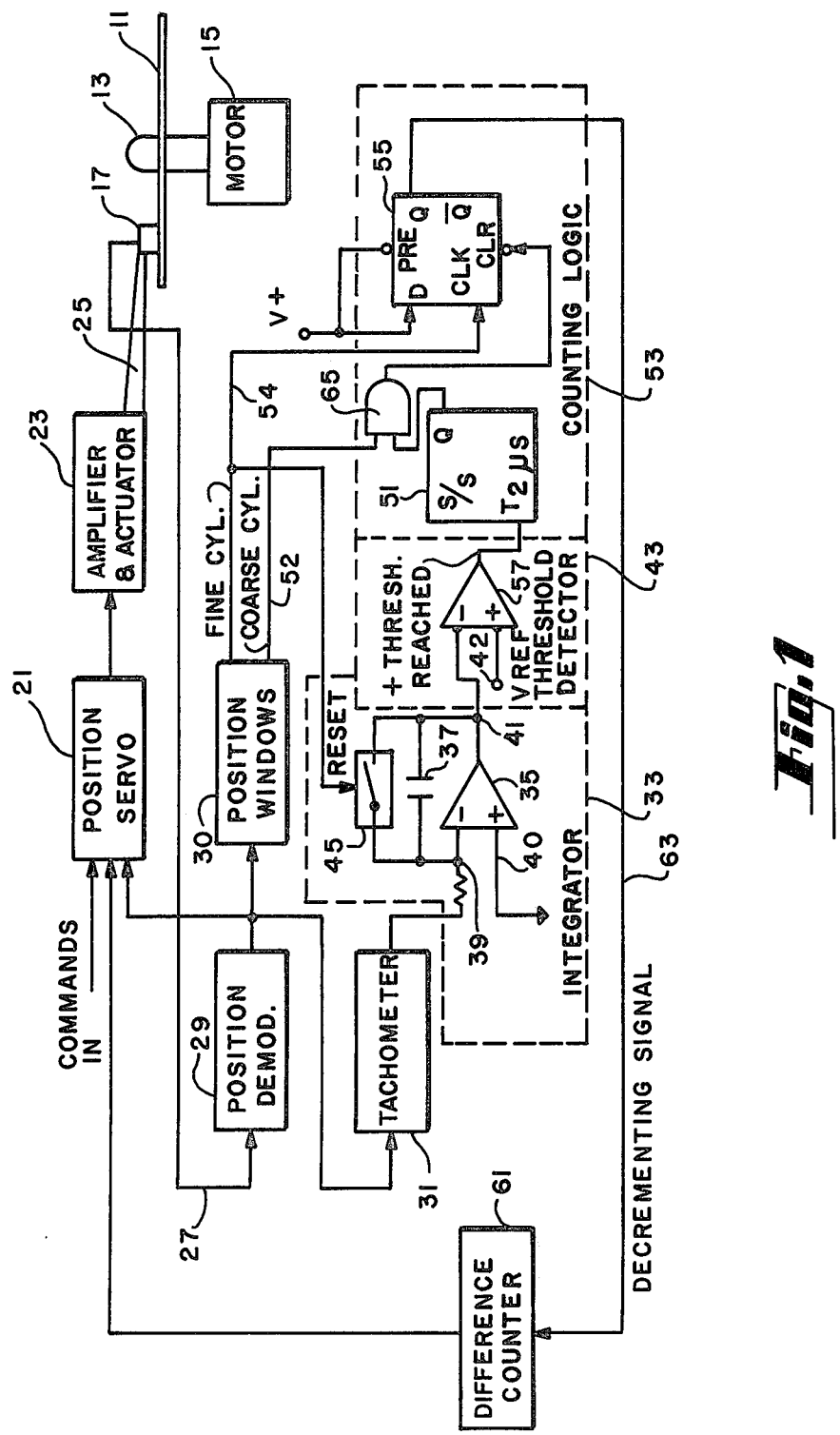
FIG. 1 is an electrical diagram of the apparatus of the present invention for counting servo tracks during position signal drop-out.

FIG. 1 shows a magnetic disk recording and playback system. While the invention is described with regard to such a magnetic system, it is not restricted to such and may be applied in other servo control systems, for example optical data recording systems. In a magnetic recording system, one or more recording media such as a disk 11 are mounted for rotation about a spindle 13 and driven by a motor 15. A transducer 17, commonly known as a servo head, is movable towards and away from the spindle 13 by means of an actuator arm 25. Magnetic data which is to be recorded, or previously recorded, in concentric tracks on the disks passes under the radially movable transducer 17. Both servo position information, as well as data, can be placed on the same disk, as described in the aforementioned U.S. Pat. No. 3,864,740. Sometimes several movable transducers are mounted on the same head support for movement relative to tracks on a plurality of parallel disks in a disk pack or the like, based on servo information picked up by one transducer. However, for purposes of simplicity, only one transducer and one disk are shown herein.

A circuit for maintaining a transducer on track is indicated by block 21. Such circuits are well known and one exemplary circuit used in a dual frequency type of servo system is described in the aforementioned U.S. Pat. No. 3,864,740. The present invention is not restricted to dual frequency servo systems, but could also be used in other types such as phase discriminating types as in U.S. Pat. No. 3,427,606 to R. J. Black and F. J. Sordello or in a limited pulse type of servo system as in U.S. Pat. No. 3,691,543 to F. E. Mueller. The output of the position servo circuit 21 is an error signal which is fed to an amplifier and actuator 23 which controls the motion of an actuator arm 25 which is linked to transducer 17 and controls the motion thereof. The electrical signals which are picked up by transducer 17 are fed via line 27 to a position demodulator 29 which transmits a position signal to the position servo circuit 21 as well as to a tachometer 31. The latter produces a velocity signal representing the radial velocity of the transducer 17 relative to the servo tracks it is crossing. In some instances, the tachometer signal may be derived other than from the position demodulator 29. For example, head velocity may be sensed optically from the motion of actuator arm 25 as shown in U.S. Pat. No. 3,755,795. The starting point of the present invention requires the availability of position and velocity signals for a transducer moving across a plurality of servo tracks.

The position signal produced by position demodulator 29 is a triangular waveform where the rise and fall of each wave represents the crossing of an odd and even servo track. Thus, each wave represents two tracks. A window detector circuit means 30 connected to position demodulator 29 produces a first pulse, termed a coarse cylinder pulse, when the transducer is in the linear portion of a track, i.e., between track crossing positions. Another, shorter pulse, termed a fine cylinder pulse, is generated corresponding to a specified position in the traverse of a servo track, such as a zero crossing. The coarse and fine cylinder pulses are used in the prior art for track or cylinder counting. This is customarily done by setting a latch at a fine cylinder window and then resetting the latch as the transducer leaves the linear portion of the position waveform, i.e., on the loss of a coarse cylinder pulse. The problem which the present invention addresses is that the extremities of the servo position waveform, where the waveform becomes non-linear, are subject to drop-out and hence the loss of a coarse cylinder pulse is not detected and the counting latch is not reset. This is illustrated in FIG. 2.

FIG. 2(a) shows the triangular detected position waveform with an even track indicated by the half wave 12 and an odd track indicated by the half wave 14. The linear portion of the half wave 12 is indicated by the marks 16 which are actually voltage levels. These levels are detected by a window detector which produces a corresponding coarse cylinder pulse 22, as shown in FIG. 2(b). A designated region in the linear portion, such as a region proximate to the zero crossing is found during a track crossing, indicated by the lines 18 on either side of the track center. A window detector circuit produces a fine cylinder pulse 24, as shown in FIG. 2(c), corresponding to the thresholds marked by the lines 18. Window detector circuits are known and are explained more fully in U.S. Pat. No. 3,694,772 to F. J. Sordello.

In FIG. 2(a) the third position wave is shown to be clipped at region 32. This corresponds to a position signal drop-out which may be caused for a number of reasons, including defects in the recording medium, noise or electrical circuit characteristics. The position signal drop-out 32 causes the window detector to fail to reach one of the coarse cylinder thresholds where the coarse cylinder pulse would be cut off. Instead, the coarse cylinder pulse 34 of FIG. 2(b) does not fall where it should and continues until a coarse threshold level is detected at region 36 where the pulse is finally cut off. However, since the coarse cylinder pulse is used to reset a counting latch, a wrong count will result because the coarse cylinder pulse 34 represents two tracks, instead of the normal one.

In the present invention, the velocity signal (not shown) is integrated to produce a simulated position signal, shown in FIG. 2(d). Returning to FIG. 1, the output of tachometer 31 is shown to be fed to a circuit within the dashed line 33, which is an integrator. The integrator 33 consists of the operational amplifier 35 with a capacitor 37 connected from the inverting input 39 to the output node 41. The non-inverting input 40 is referenced to ground. The integrator has a reset switch 45 connected across capacitor 37. The function of the switch is to reset the integrator once for each servo track so that a triangular waveform will be produced simulating a position signal. Reset switch 45 is controlled by fine cylinder pulses, FIG. 2(c), produced by the position window detector 30. The fine cylinder pulses are more reliable than the coarse cylinder pulses, FIG. 2(b), because they may be generated at linear regions of the actual position signal which are less immune to noise and to the factors which cause drop-out.

The output of the integrator 33 taken on node 41 is fed to a threshold detector indicated by the dashed line 43. The threshold detector is a voltage comparator 57 which is connected to receive the output of integrator 35 at the negative terminal 41, while the positive terminal 42 is connected to a reference voltage, $V_{REF}$. The purpose of the threshold detector 43 is to detect the crossing of the simulated position signal of a reference voltage and produce an output signal which is termed "threshold reached".

FIG. 2(d) shows the integrated velocity signal which commences with a vertical rise 36 as the integrator is reset on receipt of the fine cylinder pulse 24. The slope 38 of the velocity signal is proportional to velocity and the sloping segment is reset on the next fine cylinder pulse. The threshold voltage, $V_{REF}$, applied at terminal 42 in FIG. 1 is shown at a region which would correspond to track center. As the simulated position signal of FIG. 2(d) crosses the voltage reference level, a decrementing clock signal is produced shown in FIG. 2(f). On the vertical rise 36 of the simulated position pulse the leading edge 46 is formed while the trailing edge 48 of the crossing signal is formed when loss of coarse cylinder occurs. This pulse is the decrementing signal taken along line 63 which decrements the difference counter 61, shown in FIG. 1.

A threshold voltage crossing signal is generated when the integrator output becomes more negative than the voltage reference fed to the comparator 57. This causes the output of comparator 57 to rise, triggering the single shot 51 of counting logic 53. The single shot 51 generates a negative going pulse at the $\overline{Q}$ terminal for a position leading edge trigger pulse at the T input terminal of the single shot. The $\overline{Q}$ output of the single shot is connected to a two input AND gate 65 which also receives coarse cylinder pulses. The output of AND gate 65 is connected to the inverting clear terminal of flip-flop 55. The clock input of the flip-flop 55 is connected to receive fine cylinder pulses along line 54, while the D input terminal is connected to a voltage source, V+, so as to be permanently high. The Q output of flip-flop 55 is connected to the difference counter 61 along a line 63 through which counter decrementing signals are transmitted. The counter 61 communicates with the position servo circuit 21, signalling when a desired track has been reached.

In operation, the two input AND gate 65 will receive a coarse cylinder pulse along line 52 from the position window circuit 30 as one input and, as a second input, a fixed period, e.g. a two microsecond, pulse out of the $\overline{Q}$ terminal of single shot 51 when a threshold reached pulse occurs. The output of AND gate 65 will clear flip-flop 55 for either loss of coarse cylinder or receipt of the threshold reached pulse. The Q output of flip-flop 55 goes high on a fine cylinder pulse received along line 54 from window detector 30, but goes low either on a loss of coarse cylinder via line 52 or, if coarse cylinder is maintained, then on a threshold reached pulse. This circuit works well as long as there are fine cylinder pulses to reset the integrator 33.

In parallel with that portion of the circuit of FIG. 1, which is shown in dashed lines, or as an alternative to that portion, a self-resetting integrator may be used, as shown in FIG. 3. An input signal is derived from a tachometer signal, which is not necessarily reliant on a position signal since it can be derived from motion of actuator arm 25, or from other sources. This input signal is fed to the self-resetting integrator circuit of the present invention. An integrator within the dashed line 75, similar to integrator 33 of FIG. 1, consists of the operational amplifier 76 and the capacitor 77 connected thereacross. The integrator has a reset switch 78 connected across capacitor 77. Integrator 75 is connected to threshold detectors 83, 85 both of which are similar to the threshold detector 43 of FIG. 1. Threshold detector 83 has an output which is used to trigger single shot 91. The second threshold detector 85, combined with OR gate 95, has an output at node 89 which is used to clock the flip-flop 93 and to reset integrator 75 by means of reset switch 78. The output of integrator 75 is referenced in the first threshold detector 83 to a reference voltage V' corresponding to the passage of a first track position or characteristic, such as a zero crossing at track center similar to the referencing of the threshold detector 43. However, the second threshold detector 85 is referenced to a voltage V" corresponding to another track position, or characteristic, such as a track extremity or a constant distance, such as the width of a servo track. When fine cylinder pulses are no longer available in the position signal, due to drop out, the integrated velocity signal is compared to the V" signal to simulate fine cylinder pulses.

In operation, the integrator 75-detector 85 combination determines when a cylinder crossing occurs, while the integrator 75-detector 83 combination provides a threshold reached pulse similar to FIG. 2(e). An AND gate 92 receives an input of coarse cylinder pulses along line 52 from a window detector, like window detector 30 in FIG. 1. Another input to AND gate 92 comes from the $\overline{Q}$ output of single shot 91. The output of AND gate 92 is connected to the inverting clear terminal of flip-flop 93. The output of flip-flop 93 is once again used to decrement a difference counter.

Figure 4:
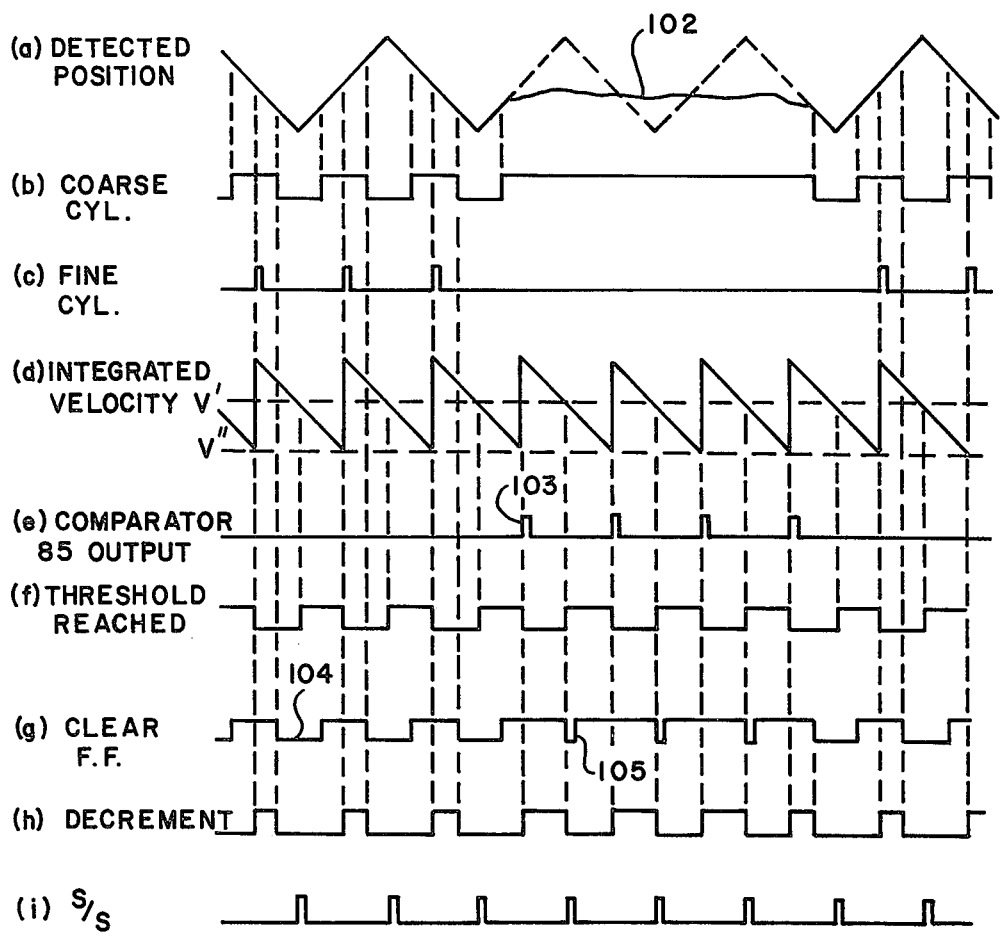
FIG. 4 shows electrical waveforms occurring in the circuit of FIG. 3.

This operation may be understood with reference to FIG. 4. In FIG. 4(a) detected position waveforms are shown, including a region 102 of position signal drop out, similar to region 32 of FIG. 2. FIG. 4(b) shows coarse cylinder pulses detected by a position window detector, such as detector 30 in FIG. 1, during normal operation. FIG. 4(c) shows fine cylinder pulses from the same detector during normal operation. During position signal drop out, both coarse cylinder and fine cylinder pulses are absent. FIG. 4(d) shows the output waveform of integrator 75 with the reference voltages V' and V" of comparators 83 and 85 superimposed as horizontal dashed lines.

FIG. 4(e) shows the output of comparator 85. A first pulse 103 occurs when the integrated velocity waveform of FIG. 4(d) becomes more negative than the reference voltage V". This occurs during position signal drop out. FIG. 4(f) shows a waveform which is the output of comparator 83, a threshold reached pulse.

FIG. 4(g) shows the waveform at the clear input terminal of flip-flop 93. The pulse occurs upon the loss of coarse cylinder pulses in normal operation, as illustrated by pulse 104, or when a threshold reached pulse occurs for position signal drop out, as illustrated by pulse 105. The output of flip-flop 93 is shown to be the counter decrementing waveform of FIG. 4(h).

For the sake of comparing the exemplary 2 microsecond output of single shot 51 with other waveforms, the single shot output pulses are shown in FIG. 4(i). An advantage of this embodiment of the invention is that the self-resetting integrator provides a simulated position signal replacing the actual position signal when position signal drop-out extends over several signal periods.

The present invention increases the reliability of servo systems by increasing the accuracy of track counting, even during servo position signal defects or the unavailability of the servo position signal for comparatively long intervals during a track accessing period.

What is claimed is:
1. In a position servo system of the type having a member movable longitudinally and transversely with respect to a plurality of servo tracks in which member position and velocity transverse to said tracks is represented by position and velocity signals, the system having a track counter to be decremented by the member crossing each track, a circuit for use in track counting in the event of position signal drop-out comprising, integrator means having an input and an output, said input connected to receive and integrate a velocity signal to produce a simulated position signal, said integrator means having a reset switch operable in response to a reset command, window circuit means, connected to said reset switch, for generating coarse and fine cylinder signals for a servo track, a fine cylinder signal being directed to said reset switch as a reset command for said integrator means so that a simulated position signal is generated by said integrator means for each servo track, detector means connected to the output of said integrator means for generating a threshold reached signal representing the passage of said simulated position signal past a preset threshold level corresponding to a characteristic of each servo track, and counting logic means for decrementing a track counter, said counting logic means connected to said threshold detection means and operable in response to said threshold reached signal.

2. The circuit of claim 1 wherein said counting logic means is connected to said window circuit means for receiving a coarse cylinder signal therefrom, said counting logic means operable in response to either loss of a coarse cylinder signal or said threshold reached signal.

3. The circuit of claim 1 wherein said detector means comprises a first voltage comparator having as an output said threshold reached signal which is connected to said counting logic means and having a first input connected to the output of said integrator means and a second input which is a reference voltage level corresponding to a fixed position on each servo track, the fixed position being said servo track characteristic.

4. The circuit of claim 3 wherein said reference voltage level corresponds to the center of a servo track.

5. The circuit of claim 3 wherein the output of said first voltage comparator is connected to said counting logic means, said counting logic means having at least one gate responsive both to said threshold reached signal and a coarse cylinder signal, for decrementing a track counter.

6. The circuit of claim 3 wherein said detector means further comprises a second voltage comparator having as an output a signal connected as an electrical substitute for said fine cylinder signal when said fine cylinder signal is not available.

7. The circuit of claim 6 wherein said first and second voltage comparators are electrically connected to have parallel inputs from an output of said integrator means.

8. In a position servo system of the type having a member movable longitudinally and transversely with respect to a plurality of servo tracks, in which member position and velocity transverse to said tracks is represented by position and velocity signals, the system having a track counter to be decremented by the member crossing each track, a circuit for use in track counting in the event of position signal drop-out comprising, integrator means having an input and an output, said input connected to receive and integrate a velocity signal to produce a simulated position signal, said integrator means having a reset switch operable in response to a reset command, a first detector means connected to the output of said first integrator means for generating a first threshold signal representing the passage of the simulated position signal from said integrator means past a preset threshold level corresponding to a first characteristic of a servo track, said first threshold signal communicating a first command to a counting logic means, a second detector means connected to the output of said integrator means for generating a second threshold signal representing the passage of the simulated position signal from said integrator means past a preset threshold corresponding to a second characteristic of a servo track, said second threshold signal communicating a reset command to the reset switch of said integrator means and communicating a second command to the counting logic means, and counting logic means connected to said first and second detector means for decrementing a track counter in response to said first and second commands.

9. The circuit of claim 8 wherein said first detector means comprises a voltage comparator having as one input the output of said integrator means and a second input which is a reference voltage level corresponding to a first fixed position on each servo track, the first fixed position being said first servo track characteristic.

10. The circuit of claim 9 wherein said reference voltage level corresponds to the center of a servo track.

11. The circuit of claim 8 or 9 wherein said second detector comprises a voltage comparator having as one input the output of said integrator means and a second input which is a reference voltage level corresponding to the track width of each servo track, the track width being said second servo track characteristic.

12. For counting servo tracks crossed by a movable member in a position servo loop, wherein the movable member has a velocity signal and a position signal partially subject to drop-out, the method comprising, electrically integrating a movable member velocity signal to form a simulated position signal, resetting the integrated velocity signal by an integrator reset signal for each servo track to form a simulated position signal for each servo track, detecting the passage of the simulated position signal past a threshold corresponding to a track position, and decrementing a counter each time a threshold passage is detected.

13. The method of claim 12 wherein the step of resetting the integrated velocity signal is achieved by detecting a constant level of the position signal and generating an integrator reset signal each time the constant level is reached.

14. The method of claim 13 further defined by detecting a second constant level of the position signal and electrically combining said two constant levels for decrementing said counter.

15. The method of claim 14 wherein said second constant level corresponds to the width of a servo track.

16. The method of claim 13 wherein said constant level corresponds to the center of a servo track.

* * * * *